(12) United States Patent
Noda et al.

(10) Patent No.: US 9,238,345 B2
(45) Date of Patent: Jan. 19, 2016

(54) MOLDED PRODUCT, CLOTHING, PRODUCTION PROCESS FOR LAMINATE, AND PRODUCTION PROCESS FOR MOLDED PRODUCT

(75) Inventors: Yosuke Noda, Yokohama (JP); Kazuhiro Tsuchiya, Komaki (JP); Yasuyuki Kabeya, Komaki (JP)

(73) Assignee: BRIDGESTONE CORPORATION, Tokyo (JP)

( * ) Notice: Subject to any disclaimer, the term of this patent is extended or adjusted under 35 U.S.C. 154(b) by 193 days.

(21) Appl. No.: 13/508,942

(22) PCT Filed: Nov. 5, 2010

(86) PCT No.: PCT/JP2010/069705
§ 371 (c)(1),
(2), (4) Date: May 9, 2012

(87) PCT Pub. No.: WO2011/058926
PCT Pub. Date: May 19, 2011

(65) Prior Publication Data
US 2012/0225257 A1    Sep. 6, 2012

(30) Foreign Application Priority Data

Nov. 11, 2009  (JP) .................................. 2009-258082

(51) Int. Cl.
*B32B 1/00* (2006.01)
*B32B 3/24* (2006.01)
(Continued)

(52) U.S. Cl.
CPC ................. *B32B 3/266* (2013.01); *A41C 3/144* (2013.01); *B29C 51/14* (2013.01); *B32B 3/263* (2013.01); *B32B 5/04* (2013.01); *B32B 5/18* (2013.01); *B32B 5/245* (2013.01); *A41C 3/00* (2013.01); *A41D 27/28* (2013.01); *A41D 31/02* (2013.01); *A41D 2400/20* (2013.01); *B29C 51/145* (2013.01); *B29D 99/0064* (2013.01); *B29K 2105/04* (2013.01); *B32B 1/00* (2013.01); *B32B 37/12* (2013.01); *B32B 38/0004* (2013.01); *B32B 2038/045* (2013.01); *B32B 2266/0278* (2013.01); *B32B 2437/00* (2013.01); *Y10T 428/24628* (2015.01)

(58) Field of Classification Search
None
See application file for complete search history.

(56) References Cited

U.S. PATENT DOCUMENTS 3,819,033 A * 6/1974 Hueber .............................. 206/5
4,136,222 A * 1/1979 Jonnes .......................... 428/116
(Continued)

FOREIGN PATENT DOCUMENTS

DE    20114873 U1 * 11/2001 ............... A41C 3/00
JP    59-133043 A       7/1984
(Continued)

OTHER PUBLICATIONS

Machine Translation of JP 2004256956 A, Sep. 2004.*
(Continued)

*Primary Examiner* — Jeff Vonch
(74) *Attorney, Agent, or Firm* — Sughrue Mion, PLLC

(57) ABSTRACT

A molded product obtained by molding a laminate which comprises a stretchable substrate made of a sheet-shaped synthetic resin foam and including multiple slits, and a stretchable surfacing material affixed to at least one surface of the substrate, wherein the substrate is bonded to the surfacing material in a state that at least some of the slits are kept opened.

11 Claims, 4 Drawing Sheets

(51) Int. Cl.
*B32B 3/26* (2006.01)
*B32B 5/04* (2006.01)
*B32B 5/20* (2006.01)
*B32B 5/22* (2006.01)
*A41C 3/14* (2006.01)
*A41D 27/28* (2006.01)
*A41D 31/02* (2006.01)
*B29C 51/14* (2006.01)
*B32B 5/18* (2006.01)
*B32B 5/24* (2006.01)
*B32B 38/00* (2006.01)
*B32B 37/12* (2006.01)
*B32B 38/04* (2006.01)
*B29D 99/00* (2010.01)
*B29K 105/04* (2006.01)
*A41C 3/00* (2006.01)

(56) References Cited

U.S. PATENT DOCUMENTS

| | | | |
|---|---|---|---|
| 4,272,850 A | 6/1981 | Rule | |
| 5,804,021 A | 9/1998 | Abuto et al. | |
| 6,581,760 B1 * | 6/2003 | Robertson | 206/5 |
| 2004/0142633 A1 * | 7/2004 | Luk | A41C 5/005 450/39 |
| 2005/0255789 A1 * | 11/2005 | Gaudet et al. | 450/41 |
| 2005/0272345 A1 * | 12/2005 | Lau | A41C 5/005 450/39 |
| 2006/0201612 A1 * | 9/2006 | Lin | A41D 31/005 156/229 |
| 2007/0082579 A1 * | 4/2007 | Baran et al. | 450/77 |
| 2009/0117824 A1 * | 5/2009 | Jian | A41C 3/14 450/38 |

FOREIGN PATENT DOCUMENTS

| | | | | |
|---|---|---|---|---|
| JP | 4-317654 A | | 11/1992 | |
| JP | 8-144105 A | | 6/1996 | |
| JP | 10131007 A | * | 5/1998 | D04B 21/12 |
| JP | 2003-013305 A | | 1/2003 | |
| JP | 2004-256956 A | | 9/2004 | |
| JP | 2004256956 A | * | 9/2004 | A41C 3/00 |
| JP | 2006-161195 A | | 6/2006 | |
| JP | 2006-240301 A | | 9/2006 | |
| JP | 2006-348423 A | | 12/2006 | |
| JP | 2009-057662 A | | 3/2009 | |
| JP | 2009-179891 A | | 8/2009 | |
| WO | WO 9853980 A1 | * | 12/1998 | B29C 67/20 |

OTHER PUBLICATIONS

Machine Translation of JP 2009057662 A, Mar. 2009.*
International Search Report, PCT/JP2010/069705, dated Dec. 28, 2010.
Japanese Office Action issued in Japanese Application No. 2009-258082 dated Feb. 4, 2014.
Extended European Search Report issued in European Application No. 10829885.2 dated Jul. 8, 2013.

* cited by examiner

MOLDED PRODUCT, CLOTHING, PRODUCTION PROCESS FOR LAMINATE, AND PRODUCTION PROCESS FOR MOLDED PRODUCT

CROSS REFERENCE TO RELATED APPLICATIONS

This application is a National Stage of International Application No. PCT/JP2010/069705 filed Nov. 5, 2010, claiming priority based on Japanese Patent Application No. 2009-258082 filed Nov. 11, 2009, the contents of all of which are incorporated herein by reference in their entirety.

TECHNICAL FIELD

The present invention relates to a molded product produced by molding a laminate that includes a substrate made of a sheet-shaped synthetic resin foam (foamed resin) and a surfacing material affixed to at least one surface of the substrate, an article of clothing including the molded product, a production process for the laminate, and a production process for the molded product.

BACKGROUND ART

In clothing such as brassieres pads, a laminate is used which is formed by laminating a surfacing material made of a cloth as a surfacing material of a substrate made of a soft polyurethane foam (Patent Documents 1, 2 and 3 given below).

Patent Document 1 (Japanese Patent Publication 2006-348423 A) states, in paragraphs 0011 and 0012, that a laminate made up of an outer stretchable soft polyurethane foam, an inner stretchable soft polyurethane foam, and a non-stretchable cloth interposed between both the foams is formed into a cup-like shape by hot molding.

Patent Document 2 (Japanese Patent Publication 2004-256956 A) states, in paragraphs 0009 to 0011, that, in a cup portion of a brassiere including a surfacing cloth and a backing cloth attached respectively to front and back surfaces of a core material made of an urethane sponge, through-holes each having a diameter of 1 to 2 mm are formed in a zigzag lattice arrangement in the core material, thus giving stretching properties and air permeability to the core material.

Patent Document 3 (Japanese Patent Publication 2006-161195 A) states, in paragraph 0011, that an inner cloth and an outer cloth are bonded respectively to front and back surfaces of a hard urethane foam sheet including many through-holes, each having an inner diameter of 3 mm, in a lattice pattern, and a brassiere pad portion is formed by hot press molding of the laminate.

Further, Patent Document 4 (Japanese Patent Publication 2009-057662 A) discloses, as illustrated in FIG. 6, a sheet body 10A made up of a soft polyurethane foam including slit-like cuts 11A formed to extend in one direction and slit-like cuts 11B formed to extend in a direction crossing the one direction. Patent Document 4 states, in paragraph 0018, that by providing the cuts 11A and the cuts 11B in the crossing directions in such a way, through-holes can be kept opened in a pad, which is formed by molding the sheet body in a state stretched in multiple directions.

Patent Document 5 (Japanese Patent Publication 59-133043 A) states a laminate sheet production process in which a surfacing material is continuously affixed, by using an adhesive, to the surface of a substrate that is made of a soft polyurethane foam, while the substrate is unrolled from a stock roll.

CITATION LIST

Patent Literature

Patent Document 1: Japanese Patent Publication 2006-348423

Patent Document 2: Japanese Patent Publication 2004-256956 A

Patent Document 3: Japanese Patent Publication 2006-161195 A

Patent Document 4: Japanese Patent Publication 2009-057662 A

Patent Document 5: Japanese Patent Publication 59-133043 A

When the laminate including the non-stretchable cloth is formed into the cup-like shape by hot molding as disclosed in Patent Document 1, it is difficult to form the laminate into the cut shape because the non-shrinkable cloth is not stretchable.

When the through-holes formed in the urethane are circular as disclosed in Patent Documents 2 and 3, there is no direction in which an opening is more easily to widen unlike the case including slits (namely, in the former case, there is no direction perpendicular to the direction in which the slits extend). Therefore, the diameter of each through-hole needs to be sufficiently increased in order to obtain good elongation properties, etc. in the hot press molding, and durability such as resistance to washing is deteriorated. Further, when the through-holes are formed, punching chips are generated. A difficulty exists in completely removing the punching chips, and the punching chips become dusts.

The sheet body 10A (FIG. 6) in Patent Document 4 is formed of a single layer of the soft urethane foam, and it does not have a surfacing material. Therefore, durability is inferior and workability is poor in sewing the sheet body to other members. Further, retention of the slit-like shape is poor, and the slit may be ripped from its end.

Moreover, if a laminate is formed by affixing a surfacing material to the surface of the sheet body 10A, strength of the laminate is poor because, as illustrated in FIG. 6, the slits extend in the sheet body in two directions, i.e., in the one direction and the direction perpendicular to the one direction.

In addition, if a laminate is produced by affixing a surfacing material to the sheet body 10A (FIG. 6) in Patent Document 4 by the method disclosed in Patent Document 5, the surfacing material is apt to wrinkle. More specifically, when the affixing is performed in such a manner that the sheet body 10A is unrolled in a state where the extending direction of the slits 11A, in FIG. 6, is aligned with a direction in which the sheet body 10A is unrolled, while tensile stress is applied in the unrolling direction, the slits B are opened in the unrolling direction and the sheet body 10A is elongated in the unrolling direction. When the tensile stress is released after the affixing, the sheet body 10A is caused to shrink in the unrolling direction with the opened slits 11B going to be closed. Hence the surfacing material is apt to wrinkle.

OBJECT AND SUMMARY OF INVENTION

An object of the present invention is to provide a production process for a laminate that can be easily molded into a desired shape, a molded product using the laminate, a production process for the molded product, and an article of clothing using the molded product.

According to a first aspect, there is provided a molded product obtained by molding a laminate which comprises a stretchable substrate made of a sheet-shaped synthetic resin foam and including multiple slits, and a stretchable surfacing material affixed to at least one surface of the substrate, wherein the substrate is bonded to the surfacing material in a state that at least some of the slits are kept opened.

A molded product according to a second aspect is characterized in that, in the molded product according to the first aspect, the slits extend in a first direction, and the surfacing material has a greater elongation rate in a second direction perpendicular to the first direction than in the first direction.

A molded product according to a third aspect is characterized in that, in the molded product according to the first or second aspect, the synthetic resin foam is a soft polyurethane foam.

A molded product according to a fourth aspect is characterized in that, in the molded product according to any one of the first to third aspects, the surfacing material is a cloth.

A molded product according to a fifth aspect is characterized in that, in the molded product according to any one of the first to fourth aspects, the molded product has a cup-like shape.

A molded product according to a sixth aspect is characterized in that, in the molded product according to the fifth aspect, the slits are opened to larger extents at positions closer to a center of the molded product.

A molded product according to a seventh aspect is characterized in that, in the molded product according to any one of the first to sixth aspects, the molding is hot press molding.

According to an eighth aspect, there is provided an article of clothing including the molded product according to any one of the first to seventh aspects.

According to a ninth aspect, there is provided a production process for a laminate comprising a stretchable substrate made of a sheet-shaped synthetic resin foam and including multiple slits, and a stretchable surfacing material affixed to at least one surface of the substrate, characterized in that the slits extend in a first direction, and the surfacing material is overlaid and affixed to the substrate while the substrate is continuously fed in the first direction.

A production process for a laminate according to a tenth aspect is characterized in that, in the production process according to the ninth aspect, the surfacing material is affixed to a surface of the substrate by using a hot-melt adhesive.

According to an eleventh aspect, there is provided a production process for a molded product according to any one of the first to seventh aspects, characterized in that the slits extend in a first direction, the laminate is cut into a predetermined size, and a cut laminate is subjected to hot press molding under pulling in a second direction perpendicular to the first direction.

A production process for a molded product according to a twelfth aspect is characterized in that, in the production process according to the eleventh aspect, a compression rate in a central side of the substrate is smaller than a compression rate in a peripheral side thereof in the hot press molding.

A production process for a molded product according to a thirteenth aspect is characterized in that, in the production process according to the twelfth aspect, a compression rate in a central region of the substrate in a direction of thickness thereof is 14-76% and a compression rate in a peripheral region thereof in the thickness direction is 85-96% in the hot press molding.

A production process for a molded product according to a fourteenth aspect is characterized in that, in the production process according to any one of the eleventh to thirteenth aspects, the surfacing material has a greater elongation rate in the second direction than in the first direction, and an elongation rate of the laminate in the second direction is 1.2-3 times an elongation rate thereof in the first direction when a same load is applied to the laminate in the first direction and in the second direction.

Advantageous Effects of Invention

The molded product according to the present invention is obtained by molding a laminate which comprises a stretchable substrate made of a sheet-shaped synthetic resin foam and including multiple slits, and a stretchable surfacing material affixed to at least one surface of the substrate. Thus, since the substrate and the surfacing material are both stretchable, the laminate can be easily molded and, after the molding, the molded product can satisfactorily maintain the shape obtained during the molding. In addition, because of including the surfacing material, the molded product has good durability and good workability when the molded product is sewed to another member.

Further, in the molded product according to the present invention, the substrate is bonded to the surfacing material in a state that at least some of the slits are kept opened. Therefore, the molded product according to the present invention has good air permeability.

In the present invention, preferably, the slits extend in a first direction, and the surfacing material has a greater elongation rate in a second direction (i.e., a direction perpendicular to the first direction) than in the first direction. In such a case, the slits are easily opened in a direction perpendicular to a slit extending direction (i.e., in the second direction), and the surfacing material is also easily elongated in the second direction, whereby the laminate is more easily elongated in the second direction. As a result, the molded product having a desired shape can be easily produced.

In contrast, if the elongation rate of the surfacing material in the second direction is set to be smaller than that in the first direction contrary to the present invention, the production of the molded product becomes harder, and a risk arises in that the slit may be closed. More specifically, the surfacing material is hard to elongate in the second direction. On the other hand, because the slit is easily opened in the second direction (i.e., the direction perpendicular to the slit extending direction), the slit or an opening is easy to elongate in the second direction and is hard to elongate in the first direction. As a result, the laminate becomes hard to elongate in both the first direction and the second direction, and a difficulty arises in molding the laminate. Further, when the slit becomes hard to open in the second direction and the extent of the opening is small under such a condition, the substrate is caused to expand in a direction perpendicular to the direction of thickness thereof when the substrate is compressed in the thickness direction with the press molding. This may lead to a risk that lateral faces of the slit are protruded and the slit is closed.

The synthetic resin foam constituting the substrate is preferably a soft polyurethane foam, and the surfacing material is preferably a cloth.

Even when the molded product has a cup-like shape curving convexly, good dimensional accuracy is obtained.

In the molded product, preferably, the slits are opened to larger extents at positions closer to a center of the molded product. With the slits opened to larger extents in the central side, good air permeability is obtained. Further, since the slits in the peripheral side of the molded product are opened to small extents or closed, the molded product is superior in durability, e.g., resistance to washing.

The molded product according to the present invention can be suitably employed in clothing, e.g., cup portions of brassieres and shoulder pads of clothes.

A production process for a laminate comprising a stretchable substrate made of a sheet-shaped synthetic resin foam and including multiple slits, and a stretchable surfacing material affixed to at least one surface of the substrate, according to the present invention, is characterized in that the slits extend in a first direction, and the surfacing material is overlaid and affixed to the substrate while the substrate is continuously fed in the first direction. By thus affixing the surfacing material to the substrate in a tightly stretched state where tensile forces are applied to both the substrate and the surfacing material, the surfacing material is prevented from wrinkling in an affixing step. Further, by thus applying tensile stress in the first direction rather than the second direction in which the slits are easily opened (i.e., in the direction perpendicular to the slit extending direction), the slits can be prevented from being opened in the affixing step. As a result, when the tensile stress is released after the affixing, the substrate can be prevented from shrinking to a large extent in the first direction and the surfacing material can be prevented from wrinkling.

An affixing method is preferably practiced, for example, as a method of affixing the surfacing material and the substrate to each other by using an adhesive, e.g., an emulsion adhesive or a hot-melt adhesive, or a method (flame lamination) of melting the surface of the substrate with a flame and affixing the surfacing material to be laminated on the melted surface.

When the affixing method is the flame lamination, the affixing can be easily practiced. Further, because the flame lamination is performed in a state applying tensile stress in the first direction (i.e., the slit extending direction), the slits are not opened. Accordingly, the inside of the slit is not melted by heating. Thus, when the tensile stress is released after the affixing, lateral walls of the slit are avoided from being fusion-bonded to each other and the slit is prevented from being closed.

Also, when the affixing is performed by using an adhesive, e.g., an emulsion adhesive or a hot-melt adhesive, the closing of the slit is prevented. In more detail, the laminate is obtained by bonding the surfacing material to the surface of the substrate with the adhesive in a state applying tensile stress in the first direction (i.e., the slit extending direction). Therefore, the adhesive does not enter the inside of the slit through an opening of the slit. It is hence possible to prevent such an event that, when the opening of the slit is returned to the original state upon release of the tensile stress, the lateral walls of the slit are bonded to each other with the adhesive having entered the inside of the slit and the slit is closed. Further, as described later, the laminate is placed in a mold and is subjected to pressure molding (hot press molding) under heating, whereby the molded product is obtained. Because the adhesive is heated and an adhesive force is weakened during the hot press molding, the surfacing material becomes peelable from the substrate, and the substrate and the surfacing material become movable relative to each other. Therefore, when a slit opening force is applied to the slit during the hot press molding, the slit is easily opened without being bound to the surfacing material. As a result, the molded product having the slits opened into the desired shapes can be obtained. Additionally, peel strength between the substrate and the surfacing material in the laminate is preferably 20-150 g. In such a case, the substrate and the surfacing material are satisfactorily peeled off during the hot press molding.

A production process for the molded product, according to the present invention, is characterized in that the laminate including the slits extending in a first direction is cut into a predetermined size, and a cut laminate is subjected to hot press molding under pulling in a second direction perpendicular to the first direction. With that production process, the molding into the molded product can be satisfactorily performed.

In the hot press molding, preferably, a compression rate in a central side of the substrate is smaller than a compression rate in a peripheral side thereof. With that feature, the slits in the central side are prevented from being compressed to such a large extent that the slits are closed or that slit areas are reduced. Hence good air permeability is obtained. Further, since the slits in the peripheral side are sufficiently compressed such that the slits are closed or that slits areas are reduced, strength in the peripheral side is increased and durability, e.g., resistance to washing, is improved.

In the hot press molding, a compression rate in a central region of the substrate in a direction of thickness thereof may be 14-76%, and a compression rate in a peripheral region thereof in the thickness direction may be 85-96%. The surfacing material may have a greater elongation rate in the second direction than in the first direction. An elongation rate of the laminate in the second direction may be 1.2-3 times an elongation rate thereof in the first direction when the same load is applied to the laminate in the first direction and in the second direction.

It is to be noted that, in the present invention, the slit means a cut penetrating through the substrate in the direction of thickness thereof and having a pair of cut faces formed on both sides of the cut, the cut faces being in contact with each other without a gap being present in the cut, when an external force is not applied.

BRIEF DESCRIPTION OF DRAWINGS

FIG. 1b is a sectional view taken along a line Ib-Ib in FIG. 1a.

DESCRIPTION OF EMBODIMENTS

Figure 1A:
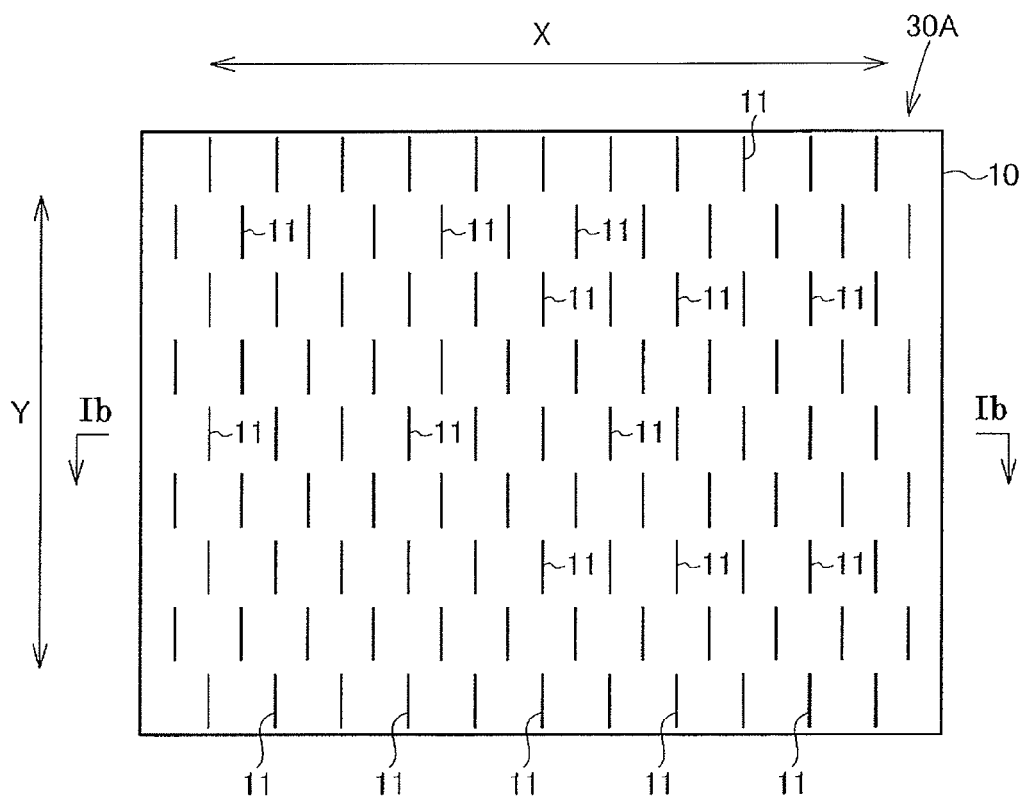
FIG. 1a is a plan view of a laminate 30A according to an embodiment.
Figure 1B:
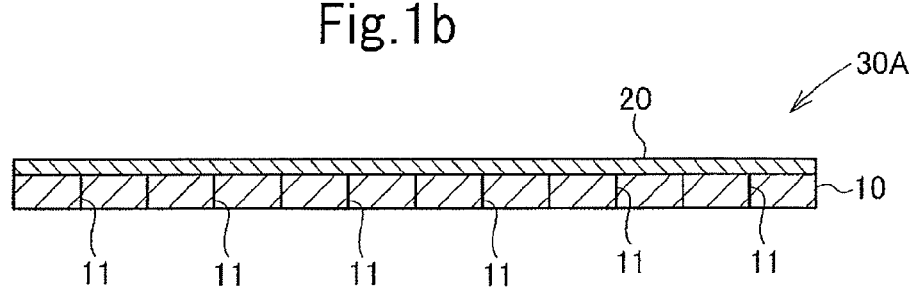
Figure 2:
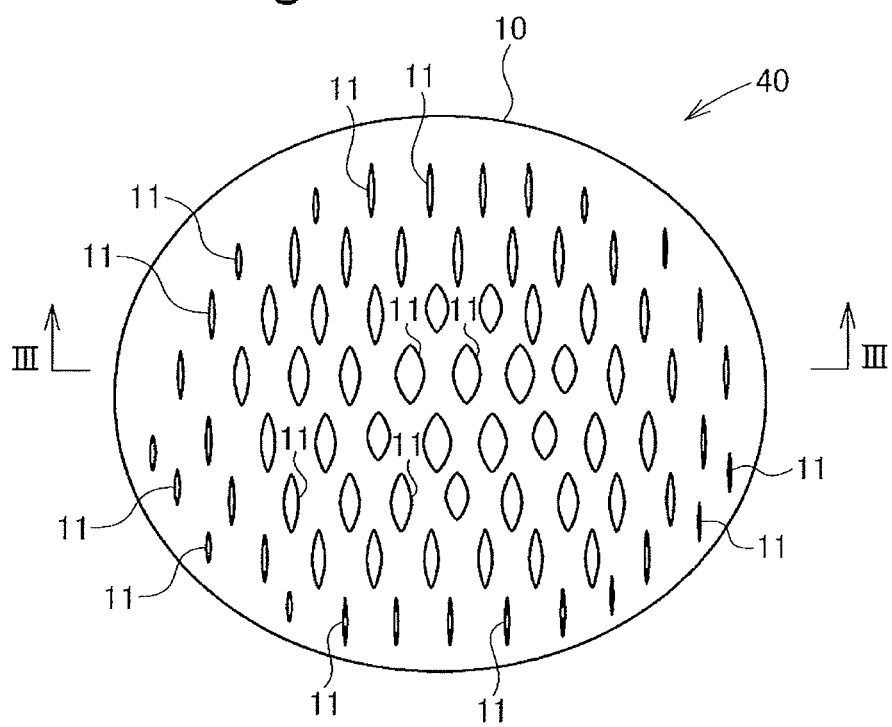
FIG. 2 is a plan view of a molded product 40 according to the embodiment.
Figure 3:
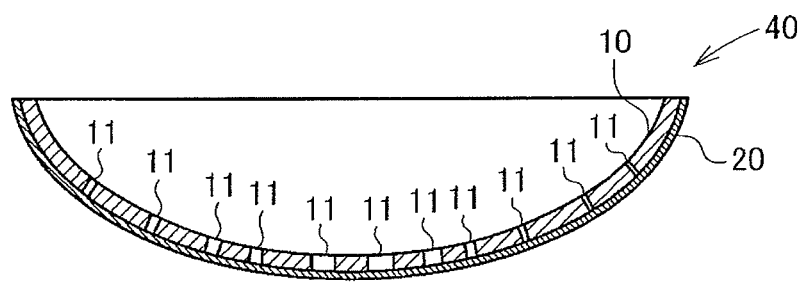
FIG. 3 is a sectional view taken along a line in FIG. 2.
Figure 4:
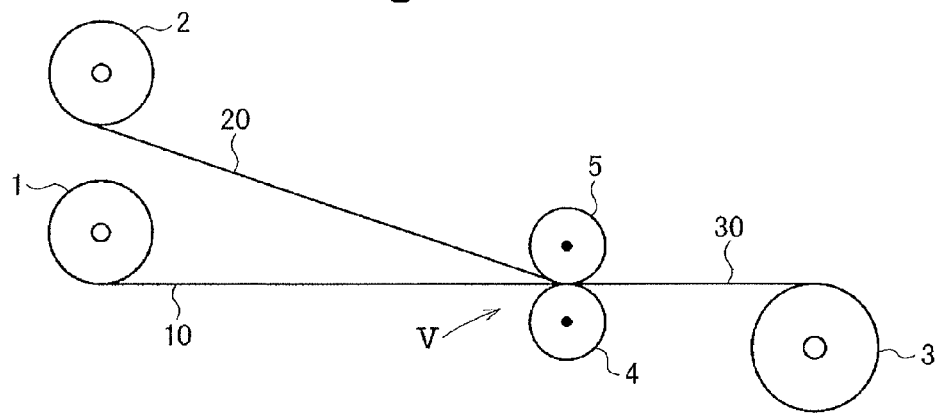
FIG. 4 is an illustration to explain one example of a production process for the laminate 30A.
Figure 5:
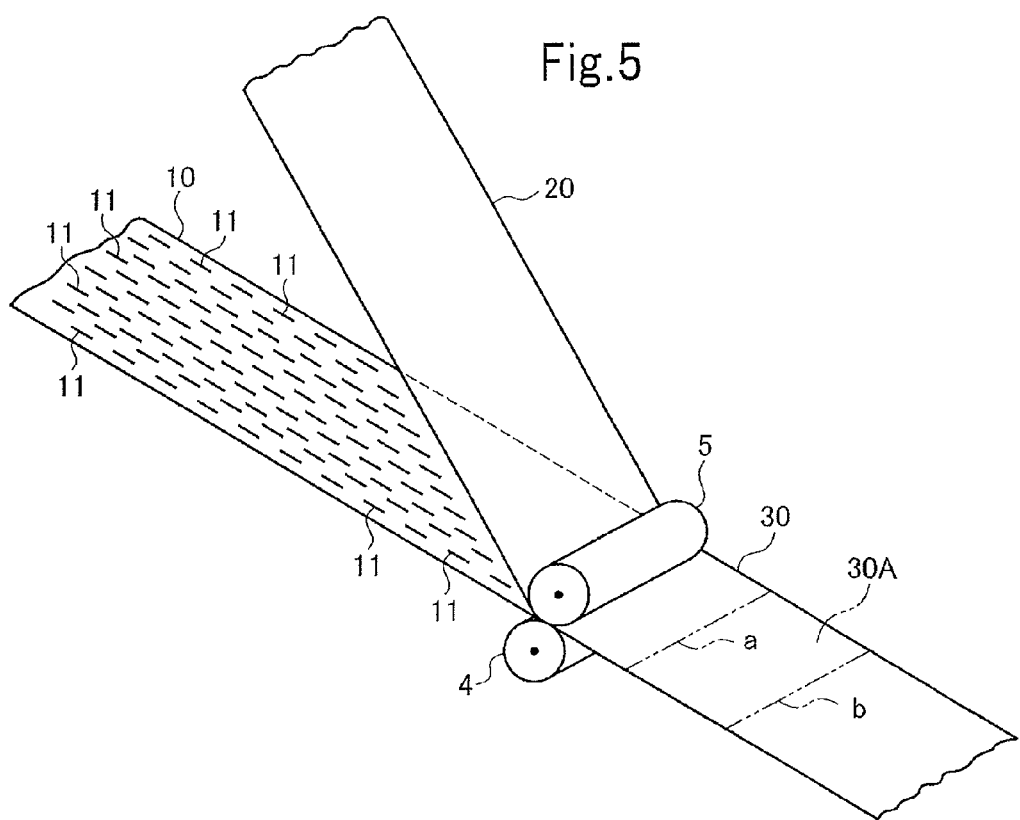
FIG. 5 is an enlarged perspective view of a portion V in FIG. 4.
Figure 6:
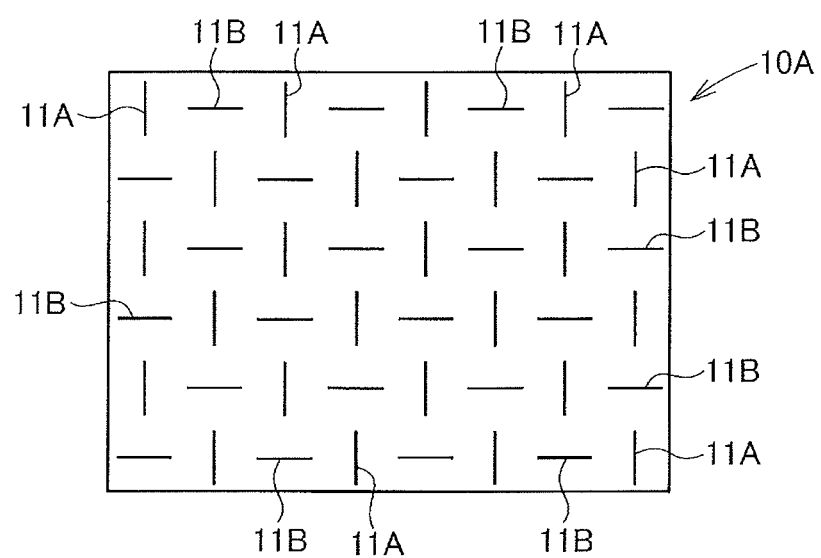
FIG. 6 is a plan view illustrating a related art.

The present invention will be described in detail below with reference to the drawings. FIG. 1a is a plan view of a laminate 30A according to an embodiment, and FIG. 1b is a sectional view taken along a line Ib-Ib in FIG. 1a. FIG. 2 is a plan view of a molded product 40 that is obtained by using the laminate 30A in FIG. 1, FIG. 3 is a sectional view taken along a line in FIG. 2, FIG. 4 is an illustration to explain one example of a production process for the laminate 30A, and FIG. 5 is an enlarged perspective view of a portion V in FIG. 4.

<Laminate 30A>

As illustrated in FIGS. 1a and 1b, the laminate 30A includes a substrate 10 made of a sheet-shaped synthetic resin foam, and a surfacing material 20 affixed to a surface (upper surface in FIG. 1b) of the substrate 10. The laminate 30A has a rectangular shape having a pair of short sides that extend in a widthwise direction (first direction) Y, and a pair of long sides that extend in a lengthwise direction (second direction) X.

The substrate 10 includes multiple slits 11 penetrating the substrate 10 in a direction toward the backside from the front side. The slits 11 can be easily formed, for example, by cutting the substrate 10 with a knife or the like. Each slit 11 is oriented in the widthwise direction Y. Therefore, the slit 11 is not opened when a tensile force is applied in the widthwise direction Y, while the slit 11 is opened when a tensile force is applied in the lengthwise direction X. Thus, the substrate 10 has a smaller elongation rate in the widthwise direction Y than in the lengthwise direction X, and it is more easily elongated in the lengthwise direction X than in the widthwise direction Y.

Here, the elongation rate represents a ratio of an amount of elongation to an original length when the substrate 10 is caused to elongate by application of a predetermined tensile force, and it means ease of elongation.

The synthetic resin foam constituting the substrate 10 is not limited to particular one. For example, a soft polyurethane foam, a polyethylene foam, a polypropylene foam, etc. can be used as the substrate 10.

The surfacing material 20 has a greater elongation rate in the lengthwise direction X than in the widthwise direction Y. Accordingly, like the substrate 10, the surfacing material 20 is also more easily elongated in a direction perpendicular to the extending direction of the slit 11 (in the lengthwise direction, i.e., the second direction X) than in the extending direction of the slit 11 (in the widthwise direction, i.e., the first direction Y).

Materials of the surfacing material 20 are not limited to particular ones. For example, a cloth of polyester, nylon, acryl, cotton, or the like can be used.

A ratio A/B of an elongation rate A of the surfacing material 20 in the lengthwise direction X to an elongation rate B thereof in the widthwise direction Y under a constant load is preferably 1.5 to 4.0, in particular 2.0 to 3.0.

As described above, because the slit 11 extends in the widthwise direction Y, the slit 11 is easily opened in the lengthwise direction X, and hence the substrate 10 is easily elongated in the lengthwise direction X. Further, because the surfacing material 20 has a greater elongation rate in the lengthwise direction X than in the widthwise direction Y, the surfacing material 20 is also easily elongated in the lengthwise direction X. Accordingly, the laminate 30A also has a greater elongation rate in the lengthwise direction X than in the widthwise direction Y, and it is more easily elongated in the lengthwise direction X than in the widthwise direction Y.

Dimensions of the substrate 10 and the surfacing material 20 are selected as appropriate depending on uses. When used as cup portions of brassieres and shoulder pads of clothes, the thickness of the substrate 10 is preferably about 7.0-25 mm, in particular about 10-20 mm, and the areal weight of the surfacing material 20 is preferably about 100-200 g/m$^2$, in particular about 130-170 g/m$^2$. The thickness of a laminate 30 is preferably about 7.0-25 mm, in particular about 10-20 mm. The thickness of the cloth occupying a part of the laminate is preferably 0.5 mm in the case of a two-layered laminate, and is preferably 1.0 mm in the case of a three-layered laminate.

The length of the slit 11 in the widthwise direction Y is preferably 3-15 mm, in particular 5-10 mm. When the length is 5 mm or more, the laminate 30A can be satisfactorily molded. When the length is 20 mm or less, the laminate 30A is satisfactorily prevented from being broken off along the slits 11.

The density of the slits 11 per unit surface area is preferably 3000-21000 slits/m$^2$, in particular 10500-21000 slits/m$^2$. When the density is 3000 slits/m$^2$ or more, the laminate 30A can be satisfactorily molded. When the density is 21000 slits/m$^2$ or less, the laminate 30A is given with sufficient strength.

The distance between the slits 11 is preferably 5-20 mm, in particular 5 to 10 mm.

<Production Process for Laminate 30A>

Next, one example of a production process for the laminate 30A will be described with reference to FIGS. 4 and 5.

The substrate 10 is fed from a substrate roll 1, and the surfacing material 20 is fed from a surfacing material roll 2. As illustrated in FIG. 5, the substrate 10 includes the multiple slits 11 orienting in a feed direction of the substrate 10. Further, the surfacing material 20 has a smaller elongation rate in the feed direction than in a direction perpendicular to the feed direction.

The substrate 10 and the surfacing material 20 thus fed are passed through a nip between a pair of pressing rolls 4 and 5 in such a state that a lower surface of the surfacing material 20 is contacted with an upper surface of the substrate 10. The substrate 10 and the surfacing material 20 are thereby press-bonded to each other.

A method for the press-bonding is not limited to particular one. For example, the substrate 10 and the surfacing material 20 may be affixed to each other by "flame lamination" through the steps of heating the upper surface of the substrate 10, which is fed from the substrate roll 1, with a flame to melt the upper surface, causing the thus-heated substrate 10 and the surfacing material 20 to pass between the pressing rolls 4 and 5, affixing the surfacing material 20 to the substrate 10 by utilizing thermal fusion-bonding properties of the synthetic resin foam that constitutes the substrate 10, and hardening them into an integral laminate. In particular, the substrate 10 and the surfacing material 20 are preferably affixed to each other by applying a hot-melt adhesive or an emulsion adhesive over the entirety or a part (e.g., at scattered points) of the upper surface of the substrate 10 by using, e.g., an adhesive applying roll with the adhesive attached to its surface, and then causing the substrate 10 and the surfacing material 20 to pass between the pressing rolls 4 and 5.

With the above-described production process, the slit 11 can be satisfactorily prevented from being closed. In more detail, because the slit 11 extends in the feed direction in which tensile stress is applied, no tensile stress is applied in the direction perpendicular to the extending direction of the slit 11 (i.e., in a direction in which the slit is easily opened). In the flame lamination, therefore, it is possible to satisfactorily prevent such an event that the inside of the slit 11 is heated in a state where the slit 11 is opened in the direction perpendicular to the extending direction of the slit 11, and that the slit 11 is closed with fusion-bonding. Further, in the case of the bonding using the adhesive, it is also possible to satisfactorily prevent such an event that the adhesive enters the inside of the slit 11 and the slit 11 is closed with the fusion-bonding.

The laminate 30 thus obtained is cut at cutting lines a and b, as illustrated in FIG. 5, whereby the laminate 30A illustrated in FIG. 1 is obtained. Here, the feed direction of the substrate 10 and the surfacing material 20 in FIG. 5 corresponds to the widthwise direction Y in FIG. 1a, and a direction in which the cutting lines a and b in FIG. 5 extend corresponds to the lengthwise direction X in FIG. 1b.

As illustrated in FIG. 4, however, the laminate 30A illustrated in FIG. 1 may be obtained by rolling the laminate 30 around a core into a laminate roll 3, feeding the laminate 30 from the laminate roll 3 as required, and by cutting the laminate 30 into a desired shape.

With the above-described production method, the surfacing material 20 of the laminate 30A can be satisfactorily prevented from wrinkling. More specifically, in FIGS. 4 and 5, because each of the substrate 10 and the surfacing material 20 has the smaller elongation rate in the feed direction than in the direction perpendicular to the feed direction, amounts of stretching and shrinking of the substrate 10 and the surfacing material 20 are small before and after tensile stress is applied in the feed direction. Hence wrinkling of the surfacing material 20 is prevented. In addition, because the slit 11 is not opened, as discussed above, in both the states before and after the application of the tensile stress, the surfacing material 20 is further satisfactorily prevented from wrinkling locally at positions near the slits 11.

If the slits 11 extend in the direction perpendicular to the feed direction unlike this embodiment, the slits 11 are opened by tensile stress applied during the feed. If the surfacing material 20 is affixed in such a state and the tensile force is released thereafter, the slits 11 are going to be closed and a shrinkage amount of the substrate 10 in the feed direction is increased. This causes the surfacing material 20 to wrinkle.

<Molded Product 40 and Production Process for Molded Product>

FIG. 2 is a plan view of the molded product 40 produced by using the laminate 30A of FIG. 1, and FIG. 3 is a sectional view taken along a line in FIG. 2. The molded product 40 has a cup-like shape projecting convexly on the side including the surface of the laminate 30A on which the surfacing material 20 is disposed.

The molded product 40 is easily produced by hot press molding of the laminate 30A. In more detail, the cup-shaped molded product 40 is produced by setting the laminate 30A in a mold, clamping the mold, and applying compressive stress to the laminate 30A in the direction of thickness thereof under heating.

In the hot press molding, the molding temperature is preferably about 190-210° C., and the molding time is preferably about 60-100 sec.

When the laminate is produced by bonding the substrate 10 and the surfacing material 20 to each other by using the hot-melt adhesive, an adhesive force of the hot-melt adhesive is weakened during the hot press molding, thus resulting in a state where the surfacing material 20 is peelable from the substrate 10 and the substrate 10 and the surfacing material 20 are relatively movable. Therefore, when a slit opening force is applied to the slits 11 during the hot press molding, the slits 11 are easily opened without being bound to the surfacing material 20. When the heating is stopped thereafter, the surfacing material 20 and the substrate 10 are bonded to each other again by the adhesive. Accordingly, the molded product having the slits 11 opened into the desired shapes can be easily obtained. Preferably, the adhesive force of the adhesive in the laminate is weak and the adhesive force of the adhesive in the molded product is strong. When the adhesive force of the adhesive in the laminate is weak as mentioned above, the surfacing material 20 and the substrate 10 are apt to peel off from each other during the hot press molding. Further, when the adhesive force of the adhesive in the molded product is strong, the surfacing material 20 and the substrate 10 are hard to peel off. Strength of the adhesive force of the adhesive can be controlled by selecting conditions, such as the molding temperature and the molding time, when the laminate and the molded product are produced. Peel strength between the substrate 10 and the surfacing material 20 in the laminate is preferably 20-150 g. In such a case, the substrate 10 and the surfacing material 20 are satisfactorily peeled off during the hot press molding.

As described above, the substrate 10 and the surfacing material 20 are more easily elongated in the lengthwise direction X than in the widthwise direction Y. Accordingly, the laminate 30A is also easily elongated in the lengthwise direction X. Therefore, when the laminate 30A is set in the mold, the laminate 30A is satisfactorily elongated in the lengthwise direction X and it can be easily set in the mold.

Further, when the laminate 30A is molded into the cup-like shape, the laminate 30A is elongated to a larger extent at positions closer to a center thereof, and hence the slits 11 positioned closer to the center are opened in larger extents. Also in the obtained molded product 40, therefore, the slits 11 positioned closer to the center thereof are opened in larger extents, as illustrated in FIGS. 2 and 3.

In the above-mentioned hot press molding, a compression rate in the thickness direction of the laminate 30A is preferably smaller in the central side than in the peripheral side. With that setting, in the molded product 40 obtained above, the slits 11 in the central side are satisfactorily opened, while the opening of the slits 11 in the peripheral side is suppressed. Stated another way, when the laminate 30A is compressed in the thickness direction thereof, the laminate 30A is caused to bulge in a direction perpendicular to the thickness direction, whereby opening areas of the slits 11 are reduced. Because the compression rate in the central side is small, the openings of the slits 11 are satisfactorily held. On the other hand, because the compression rate in the peripheral side is large, the extents of openings of the slits 11 are reduced, or the openings of the slits 11 are closed, whereby strength of a peripheral portion is increased. As a result, the molded product 40 obtained with the hot press molding is superior in both air permeability and durability, e.g., resistance to washing.

Alternatively, the laminate 30A may be demarcated into a central region and a peripheral region, and the compression rate may be set to be small in the central region and to be large in the peripheral region. In that case, the compression rate in the central region is preferably 14-76%, in particular 40-70%, and even more preferably 40-50%. The compression rate in the peripheral region is preferably 85-96%. With the compression rates held within those ranges, the extents of openings of the slits in the peripheral side are satisfactorily suppressed, and the openings of the slits in the central side are satisfactorily held. Here, the central region means, for example, a region of 10-30 mm, in particular 10-20 mm ranging from a center (top) of the molded product toward the peripheral side. The peripheral region means a region outside the central region.

Moreover, during the molding, an elongation rate of the laminate 30A in the widthwise direction Y is preferably 1.0-20%, in particular 1.4-15.2%. With the elongation rate held within those ranges, the extents of openings of the slits in the peripheral side are satisfactorily suppressed, and the openings of the slits in the central side are satisfactorily held.

In the molded product 40, since the surfacing material 20 is fusion-bonded to the substrate 10 during the hot pressing, the shape of the molded product during the molding is satisfactorily held.

The above-described embodiment is one example of the present invention, and the present invention is not limited to the above-described embodiment.

For example, while, in the laminate 30A of FIG. 1, the surfacing material 20 is disposed only on one surface of the substrate 10, the surfacing material 20 may be disposed on both the surfaces of the substrate 10.

While, in the molded product 40 of FIG. 3, the surfacing material 20 is disposed only on the convex-side surface of the substrate 10, the surfacing material 20 may be disposed only on a concave-side surface of the substrate 10, or the surfacing material 20 may be disposed on both the convex-side and concave-side surfaces of the substrate 10.

The shape of the slit formed in the substrate is not limited to one described above in the embodiment. While, in the above-described embodiment, the slit 11 extends in the widthwise direction Y and an angle formed between the widthwise direction Y and the extending direction of the slit 11 is 0°, the widthwise direction Y and the extending direction of the slit 11 may form, for example, a slight angle therebetween. The slight angle is preferably 15° or less. Further, the slit is not limited to linear one such as the slit 11 illustrated in FIG. 1, and it may have a zigzag shape similar to saw teeth or a wavy shape including an upwardly-convex circular arc and a downwardly-convex circular arc, which arcs are alternately continued.

As described above, the slit can be easily formed by using a knife, for example. Thus, unlike an opening, the slit can be formed without preparing a punching die to form the opening and without needing time and effort to remove residues generated after the punching.

Clothing using the molded product according to the above-described embodiment is superior in air permeability because the substrate has slits, and is superior in wear comfort because the surfacing material is prevented from wrinkling. Examples of the clothing include brassieres using the molded products as cup portions or pack portions, clothes using the molded products as shoulder pads, swimming wears using the molded products as cup portions, and clothes with brassieres.

EXAMPLES

The present invention will be described in detail below in connection with EXAMPLES and COMPARATIVE EXAMPLES.

Example 1

Production of Laminate

The laminate 30A was produced by affixing the surfacing material 20 to the surface of the substrate 10 with the apparatus illustrated in FIGS. 4 and 5. Details of the production will be described below.

First, the substrate 10 and the surfacing material 20 were prepared as follows.

<Substrate>

Material: urethane ("VQBN" made by Bridgestone Corporation)

Length in transverse direction (i.e., direction perpendicular to the feed direction of the substrate in FIGS. 4 and 5): 1500 mm Thickness: 10 mm Slit length: 5 mm Slit extending direction: feed direction of the substrate in FIGS. 4 and 5 (i.e., first direction)

<Surfacing Material>

Material: cloth ("KTM9605" made by Toyobo Co., Ltd.)

Length in transverse direction (i.e., direction perpendicular to the feed direction of the substrate in FIGS. 4 and 5): 1500 mm Thickness: 0.7 mm The substrate 10 was fed from the substrate roll 1, and the surfacing material 20 was fed from the surfacing material roll 2.

The substrate 10 and the surfacing material 20 were affixed to each other by the flame lamination through the steps of heating the upper surface of the substrate 10, which was fed from the substrate roll 1, by a flame to melt the upper surface, causing the thus-heated substrate 10 and the surfacing material 20 to pass between the pressing rolls 4 and 5, affixing the surfacing material 20 to the substrate 10 by utilizing thermal fusion-bonding properties of the urethane constituting the substrate 10, and hardening them into an integral laminate.

The laminate 30 thus obtained was cut into rectangular pieces each having a length of 500 mm in the feed direction and a length of 300 mm in the direction perpendicular to the feed direction, whereby the laminate 30A was obtained.

For the laminate 30A, an elongation rate $E_1$ in the first direction (i.e., the feed direction of the substrate 10 and the surfacing material 20) and an elongation rate $E_2$ in the second direction (i.e., the direction perpendicular to the fi direction) were measured, and a ratio ($E_2/E_1$) between those elongation rates was calculated. The calculated ratio is indicated in Table 1.

Production of Molded Product

The obtained laminate 30A was placed in a mold for a cup portion of a brassiere and was subjected to hot press molding at 200° C. for 3 minutes, whereby a molded product was obtained.

When the laminate 30A was placed in the mold, the laminate 30A was set such that a cloth elongating direction and a slit extending direction were perpendicular to each other (i.e., an angle formed between the cloth elongating direction and the slit extending direction was 90°). In other words, the laminate 30A was placed in the mold such that the laminate 30A was pulled in a direction perpendicular to the slit extending direction (i.e., in a direction in which the slits are opened) without being pulled in the slit extending direction.

For each of a central portion and an end portion of the molded product, a compression rate in the thickness direction with the hot press molding was measured (the compression rate being expressed by $(d_1-d_2)/d_1 \times 100$ where $d_1$ was a thickness of the laminate 30A before the hot press molding and $d_2$ was a thickness of the molded product after the hot press molding). The measured result is indicated in Table 1.

Quick Drying Test

The molded product obtained above was washed by a fully automatic washing machine. A washing time was 40 minutes, and washing, draining, rinsing, draining, rinsing, and spin-drying were performed in order named.

The molded product after the washing was dried under the following conditions and a time required for a water content to reach 50% was measured. The measured result is indicated in Table 1.

Drying conditions: room temperature of 22° C., humidity of 40%, and drying in the shade within a room Evaluation of Presence or Absence of Wrinkles The presence or the absence of wrinkles was visually observed for the molded product obtained above. The observed result is indicated in Table 1.

Evaluation of Shape

Whether the shape was good or not good was evaluated in the following three stages by visually observing the molded product obtained above. The evaluated result is indicated in Table 1.

○: very good
Δ: good
x: not good

Evaluation of Re-bonding Properties

The molded product obtained above was elongated and confirmed on misalignment and peel between the cloth and the urethane in slit portions.

The evaluation result was rated in the following three stages. The evaluated result is indicated in Table 1.
○: very good
Δ: good
x: not good

Ease in Sawing End Portion

The end portion of the molded product obtained above was sewed, and ease of the sewing was rated in the following two stages. The evaluated result is indicated in Table 1.
○: easy to sew
x: hard to sew

Usage Rate of Material

As described above, the substrate 10 made of urethane including the slits cut therein was used here. Given that the weight of the substrate having no slits on the same conditions was $W_0$ and the weight of the substrate having the slits was W, a percentage ($=W/W_0 \times 100(\%)$) of the weight (W) of the substrate having the slits with respect to the weight ($W_0$) of the substrate having no slits was calculated as a usage rate of the material. The calculated result is indicated in Table 1.

Example 2

Experiments were performed in the same manner as that in EXAMPLE 1 except that the thickness of the substrate was set to 15 mm. The obtained results are indicated in Table 1.

Example 3

Experiments were performed in the same manner as that in EXAMPLE 1 except that the substrate 10 and the surfacing material 20 were affixed to each other by using an emulsion adhesive, as described below, instead of the flame lamination.

In more detail, the substrate 10 was fed from the substrate roll 1, and the surfacing material 20 was fed from the surfacing material roll 2.

The substrate 10 and the surfacing material 20 were affixed to each other by using an adhesive applying roll with an acrylic emulsion ("NIPOL LX854EX" made by Japanese Geon Co., Ltd.) attached to its surface, applying the adhesive (in amount of 30 g/m²) to scattered points on the upper surface of the substrate 10 fed from the substrate roll 1, and then causing the substrate 10 and the surfacing material 20 to pass between the pressing rolls 4 and 5.

The obtained results are indicated in Table 1.

Example 4

Experiments were performed in the same manner as that in EXAMPLE 3 except that the thickness of the substrate was set to 15 mm. The obtained results are indicated in Table 1.

Example 5

Experiments were performed in the same manner as that in EXAMPLE 3 except that a hot-melt adhesive ("EF-5" made by Vilene Co.) was used instead of the emulsion adhesive. The obtained results are indicated in Table 1.

Example 6

Experiments were performed in the same manner as that in EXAMPLE 5 except that the thickness of the substrate was set to 15 mm. The obtained results are indicated in Table 1.

Example 7

Experiments were performed in the same manner as that in EXAMPLE 1 except that the slit length was set to 10 mm. The obtained results are indicated in Table 1.

Example 8

Experiments were performed in the same manner as that in EXAMPLE 7 except that the thickness of the substrate was set to 15 mm. The obtained results are indicated in Table 1.

Example 9

Experiments were performed in the same manner as that in EXAMPLE 3 except that the slit length was set to 10 mm. The obtained results are indicated in Table 1.

Example 10

Experiments were performed in the same manner as that in EXAMPLE 9 except that the thickness of the substrate was set to 15 mm. The obtained results are indicated in Table 1.

Example 11

Experiments were performed in the same manner as that in EXAMPLE 5 except that the slit length was set to 10 mm. The obtained results are indicated in Table 1.

Example 12

Experiments were performed in the same manner as that in EXAMPLE 11 except that the thickness of the substrate was set to 15 mm. The obtained results are indicated in Table 1.

Comparative Example 1

Experiments were performed, as described below, in the same manner as that in EXAMPLE 1 except that the substrate 10 and the surfacing material 20 were superposed one above the other without forming the slits in the substrate and without performing the flame lamination.

In more detail, the substrate 10 was fed from the substrate roll 1, and the surfacing material 20 was fed from the surfacing material roll 2. The substrate 10 and the surfacing material 20 were superposed one above the other by causing the substrate 10 and the surfacing material 20, as they were, to pass between the pressing rolls 4 and 5 without performing the flame lamination.

The obtained results are indicated in Table 2.

Comparative Example 2

Experiments were performed in the same manner as that in COMPARATIVE EXAMPLE 1 except that the thickness of the substrate was set to 15 mm. The obtained results are indicated in Table 2.

Comparative Example 3

Experiments were performed in the same manner as that in EXAMPLE 1 except that the slits were not formed. The obtained results are indicated in Table 2.

Comparative Example 4

Experiments were performed in the same manner as that in COMPARATIVE EXAMPLE 3 except that the thickness of the substrate was set to 15 mm. The obtained results are indicated in Table 2.

Comparative Example 5

Experiments were performed in the same manner as that in EXAMPLE 3 except that the slits were not formed. The obtained results are indicated in Table 2.

Comparative Example 6

Experiments were performed in the same manner as that in COMPARATIVE EXAMPLE 5 except that the thickness of the substrate was set to 15 mm. The obtained results are indicated in Table 2.

Comparative Example 7

Experiments were performed in the same manner as that in EXAMPLE 5 except that the slits were not formed. The obtained results are indicated in Table 2.

Comparative Example 8

Experiments were performed in the same manner as that in COMPARATIVE EXAMPLE 7 except that the thickness of the substrate was set to 15 mm. The obtained results are indicated in Table 2.

Comparative Examples 9-20

In each of COMPARATIVE EXAMPLES 9-20, experiments were performed in the same manner as that in EXAMPLES 1-12 except that an "angle formed between cloth elongating direction and slit direction" was set to "0°". The obtained results are indicated in Table 3.

Comparative Examples 21-32

In each of COMPARATIVE EXAMPLES 21-32, experiments were performed in the same manner as that in EXAMPLES 1-12 except that the "slit direction" was set to the "second direction" (the direction perpendicular to the feed direction of the substrate in FIGS. 4 and 5, i.e., the direction perpendicular to the first direction). The obtained results are indicated in Table 4.

Examples 13-24

In each of EXAMPLES 13-24, experiments were performed in the same manner as that in EXAMPLES 1-12 except that a "compression rate in end portion" and a "compression rate in central portion" during the hot press molding were set as indicated in Table 5. The obtained results are indicated in Table 5.

TABLE 1

| | | Example 1 | Example 2 | Example 3 | Example 4 | Example 5 | Example 6 |
|---|---|---|---|---|---|---|---|
| Lamination method | | flame lamination | | emulsion adhesive | | hot-melt adhesive | |
| Slit length | | | | 5 mm | | | |
| Slit direction | | | | first direction | | | |
| Angle formed between cloth elongating direction and slit direction | | | | 90° | | | |
| Elongation rate ratio (second direction/first direction) | | | | 2.5 | | | |
| Foam thickness | | 10 mm | 15 mm | 10 mm | 15 mm | 10 mm | 15 mm |
| Evaluation | Quick drying test (time) | 1.55 | 1.7 | 1.5 | 1.6 | 1.5 | 1.6 |
| | Wrinkling | ○ | ○ | ○ | ○ | ○ | ○ |
| | Shape of molded product | ○ | ○ | ○ | ○ | ○ | ○ |
| | Re-bonding properties | Δ | Δ | ○ | ○ | ○ | ○ |
| | Compression rate in end portion | 90 | 90 | 90 | 90 | 90 | 90 |
| | Compression rate in central portion | 40 | 40 | 40 | 40 | 40 | 40 |
| | Ease in sewing end portion | ○ | ○ | ○ | ○ | ○ | ○ |
| | Usage rate of material (%) | 96.0 | 96.0 | 96.0 | 96.1 | 96.2 | 96.5 |

| | | Example 7 | Example 8 | Example 9 | Example 10 | Example 11 | Example 12 |
|---|---|---|---|---|---|---|---|
| Lamination method | | flame lamination | | emulsion adhesive | | hot-melt adhesive | |
| Slit length | | | | 10 mm | | | |
| Slit direction | | | | first direction | | | |
| Angle formed between cloth elongating direction and slit direction | | | | 90° | | | |

TABLE 1-continued

|  |  |  |  |  |  |  |  |
|---|---|---|---|---|---|---|---|
| Elongation rate ratio (second direction/first direction) |  | 2.5 | | | | | |
|  | Foam thickness | 10 mm | 15 mm | 10 mm | 15 mm | 10 mm | 15 mm |
| Evaluation | Quick drying test (time) | 1.3 | 1.5 | 1.3 | 1.55 | 1.2 | 1.5 |
|  | Wrinkling | ○ | ○ | ○ | ○ | ○ | ○ |
|  | Shape of molded product | ○ | ○ | ○ | ○ | ○ | ○ |
|  | Re-bonding properties | Δ | Δ | ○ | ○ | ○ | ○ |
|  | Compression rate in end portion | 90 | 90 | 90 | 90 | 90 | 90 |
|  | Compression rate in central portion | 40 | 40 | 40 | 40 | 40 | 40 |
|  | Ease in sewing end portion | ○ | ○ | ○ | ○ | ○ | ○ |
|  | Usage rate of material (%) | 96.0 | 96.1 | 96.1 | 96.3 | 96.4 | 96.0 |

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Lamination method |  | no lamination | | flame lamination | | emulsion adhesive | | hot-melt adhesive | |
| Slit |  | no slits | | no slits | | no slits | | no slits | |
| Elongation rate ratio (second direction/first direction) |  | 1.5 | | 1.5 | | 1.5 | | 1.5 | |
|  | Foam thickness | 10 mm | 15 mm | 10 mm | 15 mm | 10 mm | 15 mm | 10 mm | 15 mm |
| Evaluation | Quick drying test (time) | 1.7 | 2.2 | 1.8 | 2.2 | 1.8 | 2.1 | 1.9 | 2.2 |
|  | Wrinkling | ○ | ○ | ○ | ○ | ○ | ○ | ○ | ○ |
|  | Shape of molded product | X | X | X | X | X | X | X | X |
|  | Re-bonding properties | X | X | Δ | Δ | ○ | ○ | ○ | ○ |
|  | Compression rate in end portion | 90 | 90 | 90 | 90 | 90 | 90 | 90 | 90 |
|  | Compression rate in central portion | 40 | 40 | 40 | 40 | 40 | 40 | 40 | 40 |
|  | Ease in sewing end portion | ○ | ○ | ○ | ○ | ○ | ○ | ○ | ○ |
|  | Usage rate of material (%) | 100 | 100 | 100 | 100 | 100 | 100 | 100 | 100 |

TABLE 3

|  |  | Comparative Example 9 | Comparative Example 10 | Comparative Example 11 | Comparative Example 12 | Comparative Example 13 | Comparative Example 14 |
|---|---|---|---|---|---|---|---|
| Lamination method |  | flame lamination | | emulsion adhesive | | hot-melt adhesive | |
| Slit length |  | 5 mm | | | | | |
| Slit direction |  | first direction | | | | | |
| Angle formed between cloth elongating direction and slit direction |  | 0° | | | | | |
| Elongation rate ratio (second direction/first direction) |  | 1.15 | | | | | |
|  | Foam thickness | 10 mm | 15 mm | 10 mm | 15 mm | 10 mm | 15 mm |
| Evaluation | Quick drying test (time) | 1.8 | 2.25 | 1.7 | 2.28 | 1.8 | 2.2 |
|  | Wrinkling | ○ | ○ | ○ | ○ | ○ | ○ |
|  | Shape of molded product | X | X | X | X | X | X |
|  | Re-bonding properties | Δ | Δ | ○ | ○ | ○ | ○ |

TABLE 3-continued

|  | | | | | | |
|---|---|---|---|---|---|---|
| Compression rate in end portion | 90 | 90 | 90 | 90 | 90 | 90 |
| Compression rate in central portion | 40 | 40 | 40 | 40 | 40 | 40 |
| Ease in sewing end portion | ○ | ○ | ○ | ○ | ○ | ○ |
| Usage rate of material (%) | 99.0 | 98.5 | 99.0 | 98.6 | 98.4 | 99.1 |

| | | Comparative Example 15 | Comparative Example 16 | Comparative Example 17 | Comparative Example 18 | Comparative Example 19 | Comparative Example 20 |
|---|---|---|---|---|---|---|---|
| Lamination method | | flame lamination | | emulsion adhesive | | hot-melt adhesive | |
| Slit length | | | | 10 mm | | | |
| Slit direction | | | | first direction | | | |
| Angle formed between cloth elongating direction and slit direction | | | | 0° | | | |
| Elongation rate ratio (second direction/first direction) | | | | 1.15 | | | |
| Foam thickness | | 10 mm | 15 mm | 10 mm | 15 mm | 10 mm | 15 mm |
| Evaluation | Quick drying test (time) | 1.8 | 2.2 | 1.9 | 2.3 | 1.8 | 2.4 |
| | Wrinkling | ○ | ○ | ○ | ○ | ○ | ○ |
| | Shape of molded product | X | X | X | X | X | X |
| | Re-bonding properties | Δ | Δ | ○ | ○ | ○ | ○ |
| | Compression rate in end portion | 90 | 90 | 90 | 90 | 90 | 90 |
| | Compression rate in central portion | 40 | 40 | 40 | 40 | 40 | 40 |
| | Ease in sewing end portion | ○ | ○ | ○ | ○ | ○ | ○ |
| | Usage rate of material (%) | 98.8 | 98.1 | 98.5 | 98.9 | 99.2 | 98.0 |

TABLE 4

| | | Comparative Example 21 | Comparative Example 22 | Comparative Example 23 | Comparative Example 24 | Comparative Example 25 | Comparative Example 26 |
|---|---|---|---|---|---|---|---|
| Lamination method | | flame lamination | | emulsion adhesive | | hot-melt adhesive | |
| Slit length | | | | 5 mm | | | |
| Slit direction | | | | second direction | | | |
| Angle formed between cloth elongating direction and slit direction | | | | 90° | | | |
| Elongation rate ratio (second direction/first direction) | | | | 2.5 | | | |
| Foam thickness | | 10 mm | 15 mm | 10 mm | 15 mm | 10 mm | 15 mm |
| Evaluation | Quick drying test (time) | 1.55 | 1.7 | 1.5 | 1.6 | 1.5 | 1.6 |
| | Wrinkling | X | X | X | X | X | X |
| | Shape of molded product | X | X | X | X | X | X |
| | Re-bonding properties | Δ | Δ | ○ | ○ | ○ | ○ |
| | Compression rate in end portion | 90 | 90 | 90 | 90 | 90 | 90 |
| | Compression rate in central portion | 40 | 40 | 40 | 40 | 40 | 40 |
| | Ease in sewing end portion | ○ | ○ | ○ | ○ | ○ | ○ |
| | Usage rate of material (%) | 96.2 | 96.2 | 96.3 | 96.2 | 96.0 | 96.5 |

TABLE 4-continued

|  | Comparative Example 27 | Comparative Example 28 | Comparative Example 29 | Comparative Example 30 | Comparative Example 31 | Comparative Example 32 |
| --- | --- | --- | --- | --- | --- | --- |
| Lamination method | flame lamination | | emulsion adhesive | | hot-melt adhesive | |
| Slit length | 10 mm | | | | | |
| Slit direction | second direction | | | | | |
| Angle formed between cloth elongating direction and slit direction | 90° | | | | | |
| Elongation rate ratio (second direction/first direction) | 2.5 | | | | | |
| Foam thickness | 10 mm | 15 mm | 10 mm | 15 mm | 10 mm | 15 mm |
| Evaluation Quick drying test (time) | 1.3 | 1.5 | 1.3 | 1.55 | 1.2 | 1.5 |
| Wrinkling | X | X | X | X | X | X |
| Shape of molded product | X | X | X | X | X | X |
| Re-bonding properties | Δ | Δ | ○ | ○ | ○ | ○ |
| Compression rate in end portion | 90 | 90 | 90 | 90 | 90 | 90 |
| Compression rate in central portion | 40 | 40 | 40 | 40 | 40 | 40 |
| Ease in sewing end portion | ○ | ○ | ○ | ○ | ○ | ○ |
| Usage rate of material (%) | 96.3 | 96.4 | 96.6 | 96.2 | 96.2 | 96.2 |

TABLE 5

|  | Example 13 | Example 14 | Example 15 | Example 16 | Example 17 | Example 18 |
| --- | --- | --- | --- | --- | --- | --- |
| Lamination method | flame lamination | | emulsion adhesive | | hot-melt adhesive | |
| Slit length | 5 mm | | | | | |
| Slit direction | first direction | | | | | |
| Angle formed between cloth elongating direction and slit direction | 90° | | | | | |
| Elongation rate ratio (second direction/first direction) | 2.5 | | | | | |
| Foam thickness | 10 mm | 15 mm | 10 mm | 15 mm | 10 mm | 15 mm |
| Evaluation Quick drying test (time) | 1.55 | 1.7 | 1.5 | 1.6 | 1.5 | 1.6 |
| Wrinkling | X | X | X | X | X | X |
| Shape of molded product | ○ | ○ | ○ | ○ | ○ | ○ |
| Re-bonding properties | Δ | Δ | ○ | ○ | ○ | ○ |
| Compression rate in end portion | 70 | 70 | 70 | 70 | 70 | 70 |
| Compression rate in central portion | 70 | 70 | 70 | 70 | 70 | 70 |
| Ease in sewing end portion | X | X | X | X | X | X |
| Usage rate of material (%) | 96.0 | 96.0 | 96.2 | 96.3 | 96.4 | 96.2 |

|  | Example 19 | Example 20 | Example 21 | Example 22 | Example 23 | Example 24 |
| --- | --- | --- | --- | --- | --- | --- |
| Lamination method | flame lamination | | emulsion adhesive | | hot-melt adhesive | |
| Slit length | 10 mm | | | | | |
| Slit direction | first direction | | | | | |
| Angle formed between cloth elongating direction and slit direction | 90° | | | | | |
| Elongation rate ratio (second direction/first direction) | 2.5 | | | | | |

TABLE 5-continued

| | | | | | | | |
|---|---|---|---|---|---|---|---|
| Foam thickness | | 10 mm | 15 mm | 10 mm | 15 mm | 10 mm | 15 mm |
| Evaluation | Quick drying test (time) | 1.3 | 1.5 | 1.3 | 1.55 | 1.2 | 1.5 |
| | Wrinkling | X | X | X | X | X | X |
| | Shape of molded product | ○ | ○ | ○ | ○ | ○ | ○ |
| | Re-bonding properties | Δ | Δ | ○ | ○ | ○ | ○ |
| | Compression rate in end portion | 70 | 70 | 70 | 70 | 70 | 70 |
| | Compression rate in central portion | 70 | 70 | 70 | 70 | 70 | 70 |
| | Ease in sewing end portion | X | X | X | X | X | X |
| | Usage rate of material (%) | 96.3 | 96.3 | 96.3 | 96.4 | 96.4 | 96.1 |

Results

The molded products of EXAMPLES 1-12 in which the slit extending direction was "perpendicular" were shorter in time in the quick drying tests and were more quickly dried than the molded products of COMPARATIVE EXAMPLES 1-8, each having no slits, and than the molded products of COMPARATIVE EXAMPLES 9-20 in which the slit extending direction was "parallel". The reason is presumably as follows. When the molded products of EXAMPLES 1-12 are each produced by placing the laminate 30A in the mold and molding it, the laminate 30A is placed in the mold and then molded while the laminate 30A is pulled in the direction "perpendicular" to the slit extending direction (i.e., in the direction in which the slits are opened). Therefore, the slits are kept opened in the molded product thus obtained. Because of the slits being kept opened, the molded products of EXAMPLES 1-12 are superior in air permeability and are dried more quickly.

Further, in the molded products of EXAMPLES 1-12, the shape and the re-bonding properties were both good. The reason why the shape was good is presumably in that, in the molded products of EXAMPLES 1-12, when the laminate 30A is molded, the slits are opened and hence the laminate 30A is apt to deform following the mold and to maintain its shape. The reason why the re-bonding properties was good is presumably in that stress exerted between the substrate 10 and the surfacing material 20 during the hot press molding of the laminate 30A is relieved with opening of the slits.

In particular, the molded products (EXAMPLES 3-6 and EXAMPLES 9-12), in which the substrate 10 and the surfacing material 20 were affixed to each other by using the emulsion adhesive and the hot-melt adhesive, exhibited better re-bonding properties than the molded products (EXAMPLES 1, 2, 7 and 8) in which the substrate 10 and the surfacing material 20 were affixed to each other by the flame lamination. The reason is presumably as follows. With the flame lamination, the bonding is effectuated by the action of components resulting from decomposition of the polyurethane foam that is a thermosetting resin. On the other hand, the emulsion adhesive and the hot-melt adhesive effectuate the bonding by the action of components of a thermoplastic resin and hence provide better re-bonding properties.

Better results were obtained in wrinkling and appearance shape with the case of producing the laminate 30A by feeding the substrate in the slit extending direction (i.e., the first direction) as in EXAMPLES 1-12 than with the case of producing the laminate 30A by feeding the substrate in the direction perpendicular to the slit extending direction (i.e., in the second direction) as in COMPARATIVE EXAMPLES 21-32.

In comparison with EXAMPLES 13-24 in which the compression rate in the end portion and the compression rate in the central portion were set equal to each other, wrinkling was harder to occur and the end portion was easier to sew in EXAMPLES 1-12 because the compression rate in the end portion was set in EXAMPLES 1-12 to be greater than the compression rate in the central portion.

While the present invention has been described in detail in connection with the particular embodiments, it is apparent to those skilled in the art that various changes can be made without departing from the intent and the scope of the present invention.

This application is based on Japanese Patent Application (No. 2009-258082 filed Nov. 11, 2009), which is incorporated herein in its entirety by citation.

The invention claimed is:

1. An article of clothing including a molded product obtained by hot press molding a laminate which comprises a stretchable substrate made of a sheet-shaped synthetic resin foam and including multiple slits, and a stretchable surfacing material affixed to at least one surface of the substrate,
   wherein the substrate is bonded to the surfacing material in a state that at least some of the slits are kept opened, the slits extend in a first direction, and the surfacing material has a greater elongation rate in a second direction perpendicular to the first direction than in the first direction, the molded product is molded in a cup-like shape, a compression rate in a central region of the laminate in a thickness direction is 40-50%, and a compression rate in a peripheral region of the laminate in a thickness direction is 85-96%, such that the slits are opened to larger extents at positions in the central region than at positions in the peripheral region of the molded product.

2. The article of clothing according to claim 1, wherein the stretchable surfacing material is affixed to the substrate with an emulsion adhesive or a hot-melt adhesive.

3. The article of clothing according to claim 1, wherein the elongation rate of the surfacing material in the second direction is 1.5-4 times the elongation rate thereof in the first direction.

4. The article of clothing according to claim 1, wherein the synthetic resin foam is a soft polyurethane foam.

5. The article of clothing according to claim 1, wherein the surfacing material is a cloth.

6. The article of clothing according to claim 1, wherein a thickness of the substrate is 7-25 mm, a slit length is 3-15 mm, and the slits are formed in number of 3000-21000 per 1 $m^2$.

7. The article of clothing according to claim 1, wherein the central region corresponds to a region having a length of 10-30 mm from a center of the molded product toward the peripheral region, and
wherein the peripheral region corresponds to a region outside the central region.

8. A production process for an article of clothing comprising a molded product obtained by hot press molding a laminate comprising a stretchable substrate made of a sheet-shaped synthetic resin foam and including multiple slits, and a stretchable surfacing material affixed to at least one surface of the substrate, the method comprising:
overlaying and affixing the surfacing material is overlaid and affixed to the substrate while the substrate is continuously fed in a first direction;
bonding the substrate to the surfacing material in a state that at least some of the slits are kept opened, the slits extend in the first direction, and the surfacing material has a greater elongation rate in a second direction perpendicular to the first direction than in the first direction;
molding the laminate in a cup-like shape forming the molded product,
wherein a compression rate in a central region of the laminate in a thickness direction is 40-50%, and a compression rate in a peripheral region of the laminate in a thickness direction is 85-96%, such that the slits are opened to larger extents at positions in the central region than at positions in the peripheral region of the molded product.

9. The production process for the article of clothing according to claim 8, wherein the surfacing material is affixed to a surface of the substrate by using a hot-melt adhesive.

10. The production process for the article of clothing according to claim 8, wherein the laminate is cut into a predetermined size and the cut laminate is subjected to the hot press molding under pulling in a second direction perpendicular to the first direction.

11. The production process for the article of clothing according to claim 8, wherein an elongation rate of the laminate in the second direction is 1.2-3 times an elongation rate thereof in the first direction when a same load is applied to the laminate in the first direction and in the second direction.

* * * * *